(12) United States Patent
Farrow (10) Patent No.: US 8,181,927 B2
(45) Date of Patent: May 22, 2012

(54) PROVIDING CONSTANT COUNTERBALANCE THROUGHOUT PREDETERMINED RANGE OF MOTION

(75) Inventor: Timothy Samuel Farrow, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 266 days.

(21) Appl. No.: 12/410,932

(22) Filed: Mar. 25, 2009

(65) Prior Publication Data

US 2010/0250152 A1 Sep. 30, 2010

(51) Int. Cl.
*E04G 3/00* (2006.01)

(52) U.S. Cl. ............... 248/292.11; 248/292.13; 248/325

(58) Field of Classification Search ............... 248/284.1, 248/291.1, 292.11, 292.12, 292.13, 323, 248/324, 325, 330.1, 331, 332, 917, 281.1, 248/125.2, 587, 590, 592; 361/681–683
See application file for complete search history.

(56) References Cited

U.S. PATENT DOCUMENTS

| | | | | |
|---|---|---|---|---|
| 5,609,316 A * | 3/1997 | Tigliev | ...................... | 248/292.11 |
| 5,826,846 A * | 10/1998 | Buccieri et al. | .......... | 248/280.11 |
| 6,070,839 A * | 6/2000 | Brenner et al. | .......... | 248/292.11 |
| 6,382,577 B1* | 5/2002 | McCoy et al. | ............. | 248/284.1 |
| 6,484,993 B2* | 11/2002 | Huffman | ....................... | 248/323 |
| 7,445,187 B2* | 11/2008 | Shin | ............................. | 248/324 |
| 2006/0091274 A1* | 5/2006 | Asamarai et al. | ........ | 248/292.11 |
| 2007/0001076 A1* | 1/2007 | Asamarai et al. | ........ | 248/281.11 |

\* cited by examiner

*Primary Examiner* — Tan Le
(74) *Attorney, Agent, or Firm* — VanLeeuwen & VanLeeuwen; Carlos Munez-Bustamante (57) ABSTRACT

An apparatus includes a lever arm that couples to a pivot point on one end and a display on the other end. The lever arm rotates around the pivot point through a lever arm range of motion, and the weight of the display produces a display torque around the pivot point that varies as the lever arm rotates through the lever arm range of motion. The apparatus also includes a spring that couples to the lever arm using a cable. The spring produces, through the lever arm, a spring torque around the pivot point that is equally opposite of the display torque throughout the lever arm range of motion.

6 Claims, 10 Drawing Sheets

| theta (degrees) | theta (radians) | TFT Torque | CB Torque | Resultant Torque |
|---|---|---|---|---|
| 0 | 0 | 0 | 0 | 0 |
| 5 | 0.087222 | 0.087112 | -0.087112 | 0 |
| 10 | 0.174444 | 0.173561 | -0.173561 | 0 |
| 15 | 0.261667 | 0.258691 | -0.258691 | 0 |
| 20 | 0.348889 | 0.341854 | -0.341854 | 0 |
| 25 | 0.436111 | 0.422418 | -0.422418 | 0 |
| 30 | 0.523333 | 0.49977 | -0.49977 | 0 |
| 35 | 0.610556 | 0.573323 | -0.573323 | 0 |
| 40 | 0.697778 | 0.642516 | -0.642516 | 0 |
| 45 | 0.785 | 0.706825 | -0.706825 | 0 |
| 50 | 0.872222 | 0.76576 | -0.76576 | 0 |
| 55 | 0.959444 | 0.818873 | -0.818873 | 0 |
| 60 | 1.046667 | 0.86576 | -0.86576 | 0 |
| 65 | 1.133889 | 0.906065 | -0.906065 | 0 |
| 70 | 1.221111 | 0.939481 | -0.939481 | 0 |
| 75 | 1.308333 | 0.965754 | -0.965754 | 0 |
| 80 | 1.395556 | 0.984685 | -0.984685 | 0 |
| 85 | 1.482778 | 0.996129 | -0.996129 | 0 |
| 90 | 1.57 | 1 | -1 | 0 |
| 95 | 1.657222 | 0.996268 | -0.996268 | 0 |
| 100 | 1.744444 | 0.984961 | -0.984961 | 0 |
| 105 | 1.831667 | 0.966166 | -0.966166 | 0 |
| 110 | 1.918889 | 0.940025 | -0.940025 | 0 |
| 115 | 2.006111 | 0.906737 | -0.906737 | 0 |
| 120 | 2.093333 | 0.866556 | -0.866556 | 0 |
| 125 | 2.180556 | 0.819786 | -0.819786 | 0 |
| 130 | 2.267778 | 0.766783 | -0.766783 | 0 |
| 135 | 2.355 | 0.707951 | -0.707951 | 0 |
| 140 | 2.442222 | 0.643736 | -0.643736 | 0 |
| 145 | 2.529444 | 0.574627 | -0.574627 | 0 |
| 150 | 2.616667 | 0.501149 | -0.501149 | 0 |
| 155 | 2.703889 | 0.423861 | -0.423861 | 0 |
| 160 | 2.791111 | 0.34335 | -0.34335 | 0 |
| 165 | 2.878333 | 0.260229 | -0.260229 | 0 |
| 170 | 2.965556 | 0.175129 | -0.175129 | 0 |
| 175 | 3.052778 | 0.088698 | -0.088698 | 0 |
| 180 | 3.14 | 0.001593 | -0.001593 | 0 |

PROVIDING CONSTANT COUNTERBALANCE THROUGHOUT PREDETERMINED RANGE OF MOTION

BACKGROUND OF THE INVENTION

1. Technical Field

The present invention relates to providing a constant counterbalance throughout a predetermined range of motion. More particularly, the present invention relates to utilizing a spring to provide a non-linear counter torque to a lever arm throughout the lever arm's range of motion.

2. Description of the Related Art

An apparatus may use a counter weight for balancing purposes when the apparatus lifts/holds objects, such as those used in traction lifts (elevators), cranes and funfair rides. The expected load multiplied by the distance that load is spaced from a pivot point (lever arm) is referred to as a load moment, and the counterweight times its distance from the pivot point is referred to as the counterweight moment. In order to prevent over-balancing on either side, the load moment must equal the counterweight moment, which is fairly straight forward in linear applications where the load moment remains constant throughout the lever arm's range of motion. Non-linear applications, however, result in the load moment itself becoming non-linear throughout the lever arm's range of motion.

SUMMARY

An apparatus includes a lever arm that couples to a pivot point on one end and a display on the other end. The lever arm rotates around the pivot point through a lever arm range of motion, and the weight of the display produces a display torque around the pivot point that varies as the lever arm rotates through the lever arm range of motion. The apparatus also includes a spring that couples to the lever arm using a cable. The spring produces, through the lever arm, a spring torque around the pivot point that is equally opposite of the display torque throughout the lever arm range of motion.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description. The following detailed description will generally follow the summary of the invention, as set forth above, further explaining and expanding the definitions of the various aspects and embodiments of the invention as necessary.

Figure 1A:
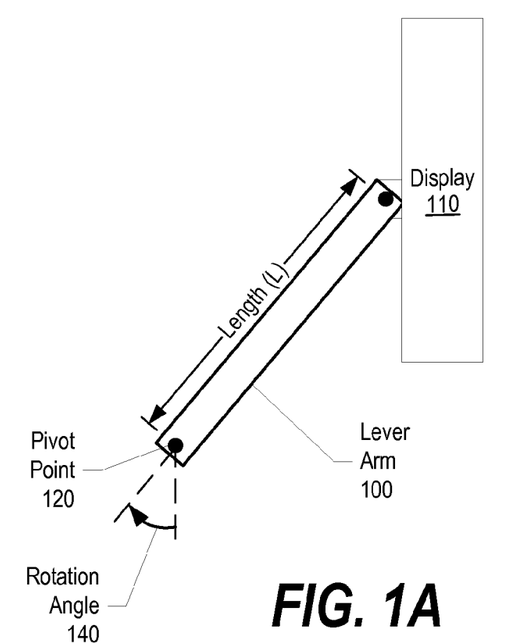
FIG. 1A is a diagram showing a display coupled to a lever arm.

FIG. 1A is a diagram showing a display coupled to a lever arm. Display 110 is a device that projects images, such as a computer monitor (e.g., liquid crystal display (LCD)) or a television. Display 110 couples to lever arm 100 through a coupling device, such as a bracket, at the end of lever arm 100.

At lever arm 100's other end at a distance of length "L" from display 110's coupling, lever arm 100 couples to pivot point 120, which may be a cylindrical device (e.g., pin, rod, etc.) attached to a base that allows lever arm 100 to rotate (rotation angle 140) around pivot point 120 throughout a particular range of motion. For example, lever arm 100 may have a 180 degree range of motion that rotates from a top vertical position to a bottom vertical position. In this example, a torque produced by display 110 around pivot point 120 through lever arm 100 non-linearly increases to a maximum value when lever arm 100 is in a horizontal position (see FIGS. 1B, 2 and corresponding text for further details).

Figure 1B:
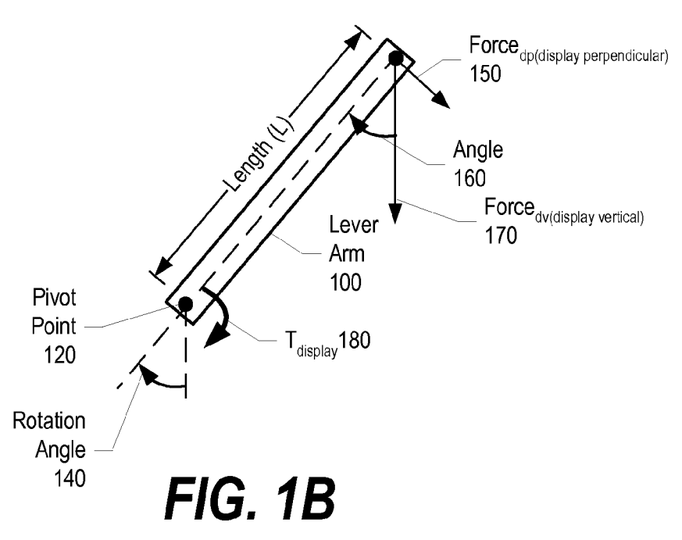
FIG. 1B is a diagram showing force vectors applied to a lever arm from a display.

FIG. 1B is a diagram showing force vectors applied to a lever arm from a display. Referring to FIG. 1A, when display 110 couples to lever arm 100, display 110's weight produces $Force_{dv(display\ vertical)}$ 170 ($F_{dv}$) and $Force_{dp(display\ perpendicular)}$ 150 ($F_{dp}$). The torque applied to pivot point 120 may be computed by the formula:

$$Torque = L * F = \text{Lever arm length} * \text{Force}$$

In this formula, the lever arm length is "L" and the force is the force perpendicular to the lever arm, or Force$_{dp}$ 150. Angle 160 is the same as rotation angle 140, and since sin(Θ)=Force$_{dp}$ 150/Force$_{dv}$ 170, $$F_{dp}=F_{dv}*\sin(\Theta)).$$

As a result, the display torque (T$_{display}$ 180) around pivot point 120 in terms of F$_{dv}$ is:

$$T_{display}(\Theta)=L*F_{dv}\sin(\Theta).$$

Figure 2:
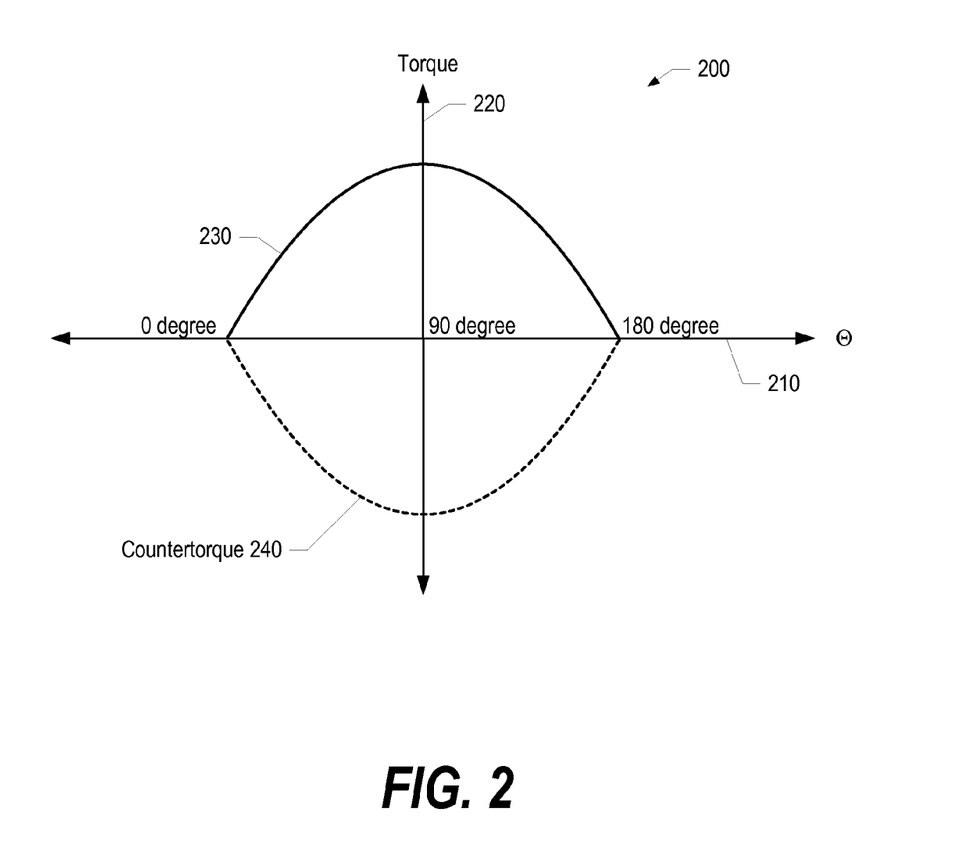
FIG. 2 is a graph showing display torque based upon a rotation angle around a pivot point.
Figure 7:
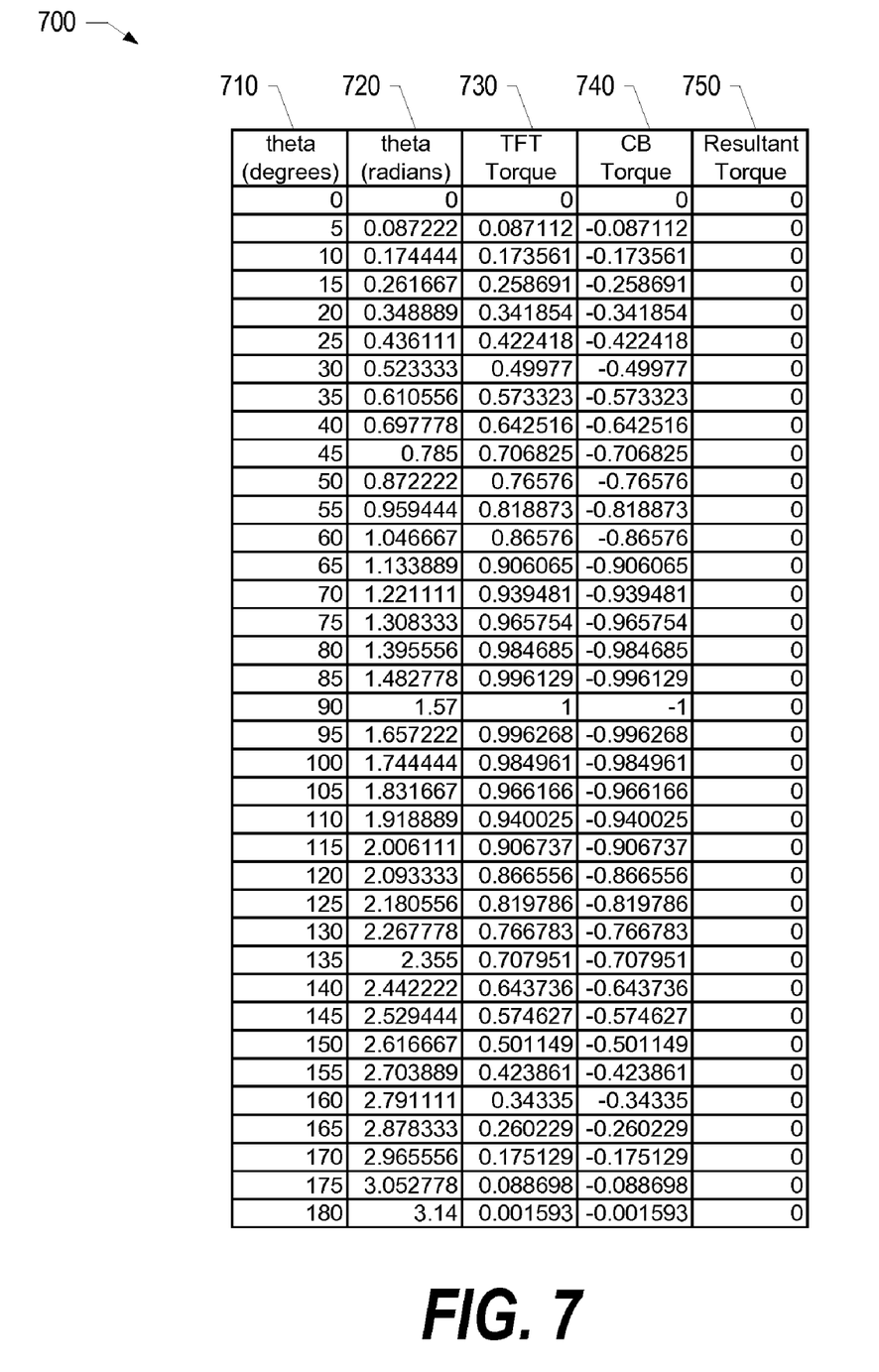
FIG. 7 is a table showing a spring torque canceling out a display torque throughout a lever arm's range of motion.
Figure 8:
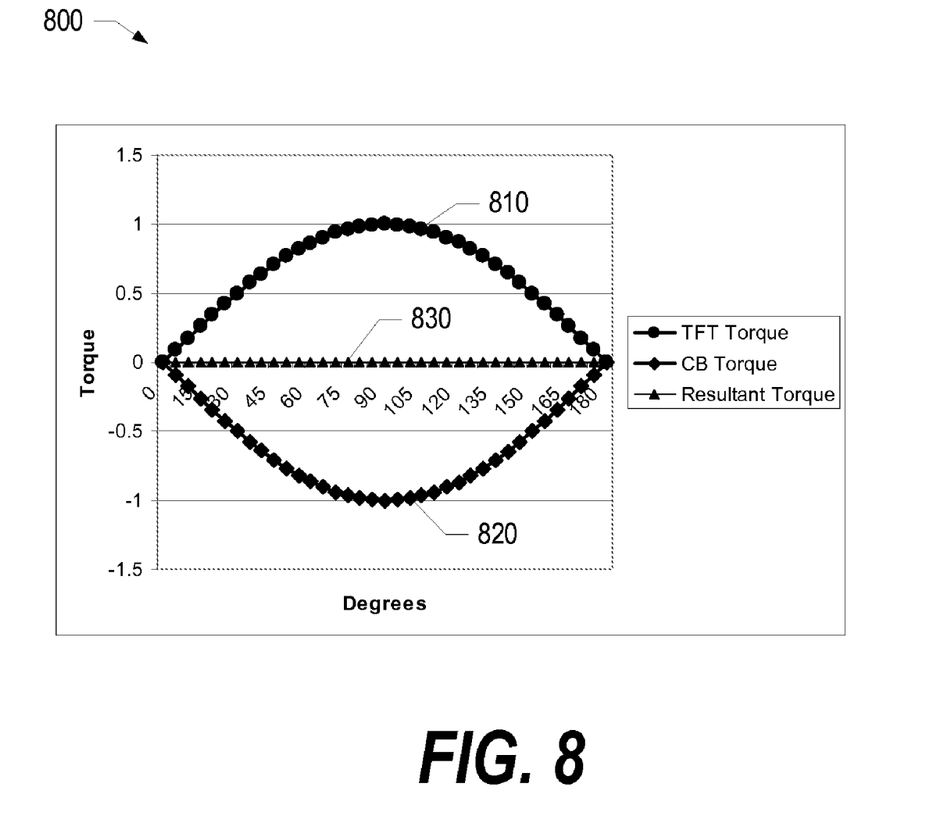
FIG. 8 is a diagram that graphically plots table values shown in FIG. 7.

As can be seen from the formula above, the display torque varies depending upon Θ, which is rotation angle 140 (see FIGS. 2, 7, 8, and corresponding text for further details). This formula is later used in FIG. 5B to compare the display torque to an equally and opposite spring torque.

FIG. 2 is a graph showing display torque based upon a rotation angle around a pivot point. Graph 200 plots the formula T$_{display}$(Θ)=L*F$_{dv}$ sin(Θ), which was derived in FIG. 1B's discussion above. X-axis 210 represents the rotation angle (Θ) when the lever arm rotates from 0 degrees (vertical top), to 90 degrees (horizontal position), to 180 degrees (vertical bottom). Y-axis 220 represents the torque around the pivot point from the weight of a display coupled to the lever arm. As can be seen, plot 230 shows that the display torque travels along a sinusoidal pattern and reaches a maximum point at 90 degrees, which is when the lever arm is in a horizontal position. In order to compensate for the display torque that varies over the lever arm's range of motion, a spring mechanism is employed that provides a "counter torque" (counter torque 240) equal but opposite to plot 230. As can be seen, plot 240's values cancel out plot 230's values throughout the entire range of motion, resulting in a net torque of zero (see FIG. 8 and corresponding text for further details).

Figure 3:
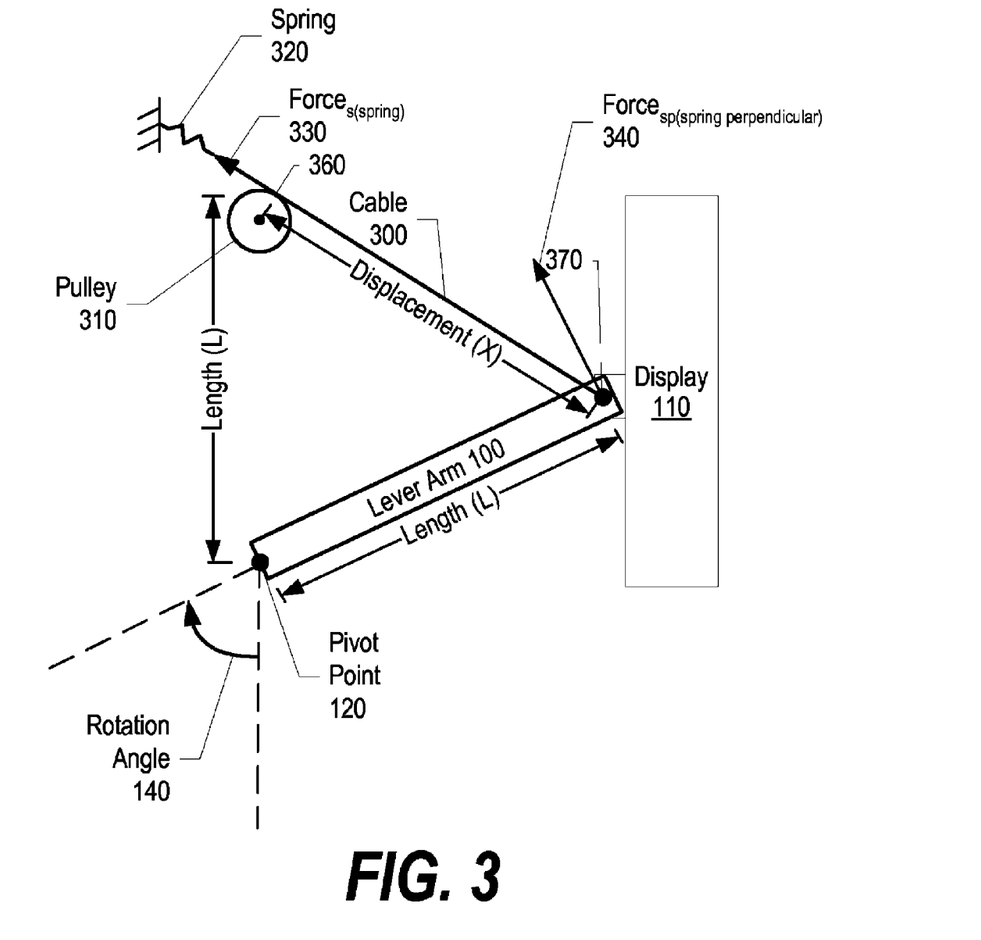
FIG. 3 is a diagram showing an embodiment of the invention described herein using a tension spring.

FIG. 3 is a diagram showing an embodiment of the invention described herein using a tension spring. Cable 300 couples to lever arm 100 at point 370 and also couples to spring 320. The embodiment shown in FIG. 3 includes a tension spring that provides a spring constant (K). As one skilled in the art can appreciate, a torsion spring may also be used, such as the example shown in FIG. 10.

Cable 300 feeds over pulley 310. As such, spring 320 may be located in areas other than that shown in FIG. 3, such as below pulley 310 or horizontal to pulley 310. Pulley 310 is located at a distance from pivot point 120 such that the cable location point 360 on top of pulley 310 is at a distance "L" (lever arm length) from pivot point 120. In one embodiment, the radius of pulley 310 in minimized in order for the curve of pulley 310 to be tangent to the vertical axis of the pivot and tangent to the cable when rotation angle 140 is equal to zero.

Figure 4A:
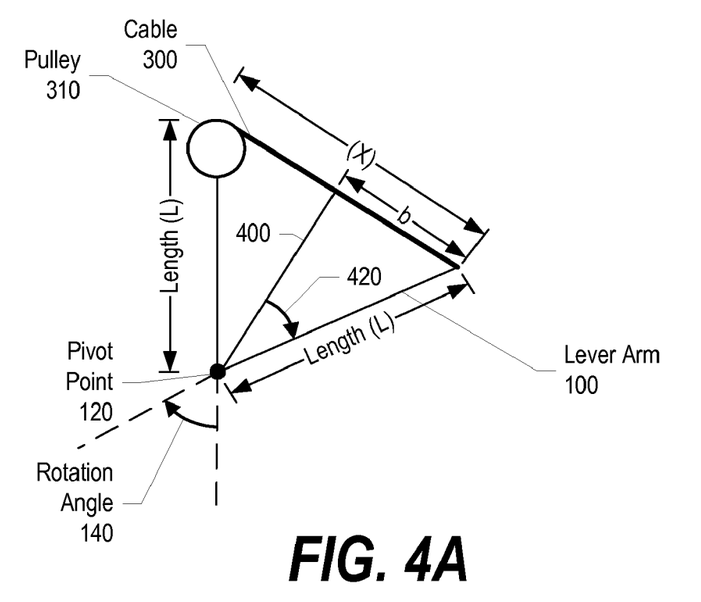
FIG. 4A is a diagram showing a spring displacement distance relative to a lever arm rotation angle.
Figure 4B:
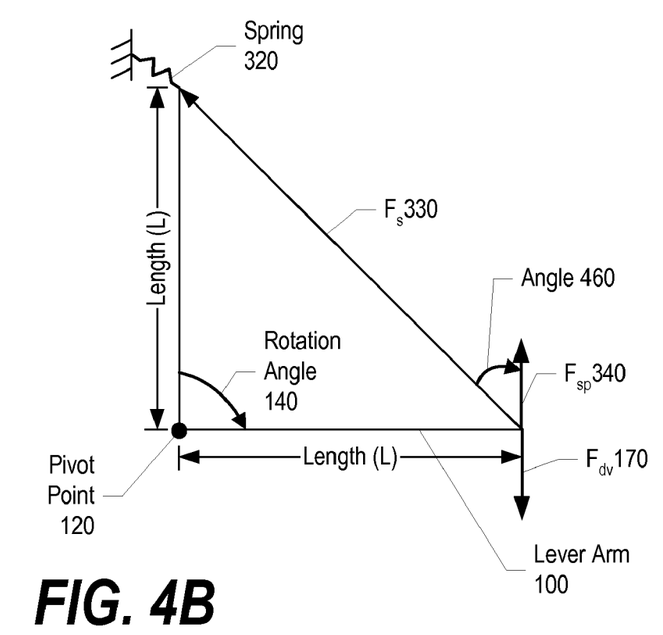
FIG. 4B is a diagram showing a spring force required to counter balance a display force throughout a lever arm's range of motion.

When lever arm 100 rotates away from pulley 310 at a displacement of "X," spring 320 produces Force$_{s(spring)}$330 (F$_s$) that is equal to the formula Force=K*X, where K is the spring constant and X is the displacement (see FIGS. 4A-B, and corresponding text for further details). A byproduct of Force$_{s(spring)}$330 is Force$_{sp(spring perpendicular)}$340 (F$_{sp}$), which is a force that is perpendicular to lever arm 100 and is utilized to compute a spring torque around pivot point 120 (see FIG. 4B and corresponding text for further details).

FIG. 4A is a diagram showing a spring displacement distance "X" relative to a lever arm rotation angle "Θ." Lever arm 100 has a length of "L" and rotates around pivot point 120 (rotation angle Θ 140) from pulley 310, which is also located at the same distance "L" from pivot point 120. In order to compute the displacement X relative to angle 140, imaginary line 400 is drawn perpendicular to cable 300, which results in a triangle with base b and angle 420, which is one-half of angle 140. As such:

$$\sin(\Theta/2)=b/L,$$

$$b=L*\sin(\Theta/2);$$

$$\text{since } X=2b, X(\Theta)=2L\sin(\Theta/2).$$

The formula X=2L sin(Θ/2) is used in FIG. 4B below to compute the force of a spring.

FIG. 4B is a diagram showing a spring force required to counter balance a display force throughout a lever arm's range of motion. As discussed in FIG. 3, a spring force produced by spring 320 when it displaces a distance "X" is $$\text{Force}_s\mathbf{330}=F_s=K*X.$$

Since the displacement depends upon rotation angle 140, the formula may be written as $$F_s=K*X(\Theta), \text{ or } K=F_s/X(\Theta).$$

When lever arm 100 is at a horizontal position, the force of a display (F$_{dv}$170) equals the display's perpendicular force on lever arm 100 (F$_{dp}$150) shown in FIG. 1B. In turn, by producing a counter force equal to F$_{dv}$ 170, lever arm 100 stabilizes in the horizontal position. As discussed in FIG. 3, F$_{sp}$ 340 is the perpendicular force produced by spring 320. By making F$_{sp}$ 340 equal to F$_{dv}$ 170 and since Θ/2=45 degrees, $$F_s=\sqrt{2}F_{sp}=\sqrt{2}F_{dv}.$$

Therefore, using this formula and the formula derived in FIG. 4A:

$$K=F_s/X(\Theta)=\sqrt{2}F_{dv}/2L\sin(\Theta/2).$$

Since, in this example, Θ=π/2 (90 degrees), the formula results in:

$$K=\sqrt{2}F_{dv}/2L\sin(\pi/4).$$

Since sin(π/4)=√2/2, the formula reduces to:

$$K=F_{dv}/L.$$

Therefore, the spring force results in:

$$F_s=K*X(\Theta))=(F_{dv}/L)*(2L\sin(\Theta)/2));$$

$$F_s=2F_{dv}\sin(\Theta/2)$$

Figure 5A:
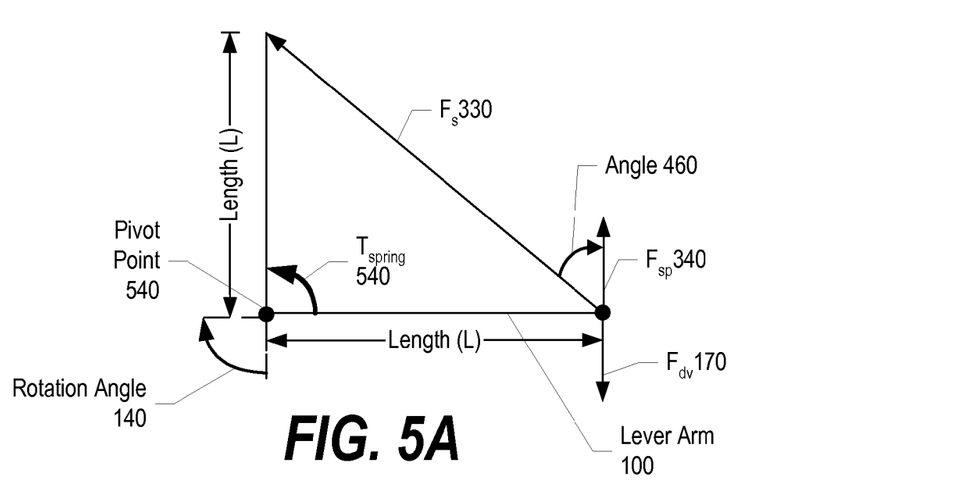
FIG. 5A is a diagram showing a non-linear spring torque rotating counterclockwise around a pivot point.

Since the spring force is a function of the rotation angle and the vertical display force as shown in the above formula, a spring torque value around pivot point 120 may also be derived, using the spring force formula above, as a function of the rotation angle and vertical display force (see FIG. 5A and corresponding text for further details).

FIG. 5A is a diagram that shows a non-linear spring torque rotating counterclockwise around a pivot point. Spring torque 540 (T$_{spring}$) is a function of the formula:

$$\text{Torque}=\text{Lever arm}*\text{Force}.$$

As such, T$_{spring}$(Θ)=L*F$_{sp}$, where L is the lever arm length and F$_{sp}$ is F$_{sp}$ 340, which is the perpendicular force created by the spring. Since angle 460 is half of rotation angle 140, $$F_{sp}=F_s*\cos(\Theta/2).$$

And, since F$_s$=2F$_{dv}$ Sin(Θ/2) as computed in FIG. 4B's discussion above, $$T_{spring}(\Theta)=L*2F_{dv}\sin(\Theta/2)\cos(\Theta/2).$$

Since trigonometry includes a property that shows sin(Θ)=½ sin(Θ/2)cos(Θ/2), the above formula may be reduced to:

$$T_{spring}(\Theta)=L*F_{dv}\sin(\Theta)$$

This formula is used during the discussion of FIG. 5B below to compare the spring torque to the display torque as a function of the rotation angle.

Figure 5B:
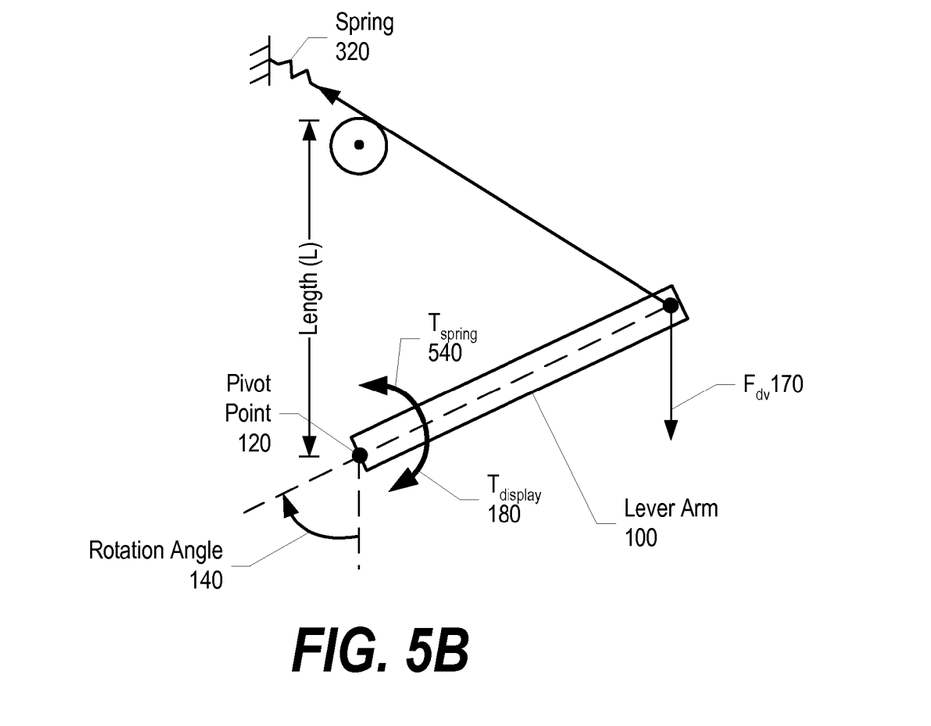
FIG. 5B is a diagram comparing a display torque around a pivot point to a spring torque around the pivot point.

FIG. 5B is a diagram that compares a display torque around a pivot point to a spring torque around the pivot point. As shown above, $$T_{spring}(\Theta)=L*F_{dv}\sin(\Theta)\text{(from FIG. 5A), and}$$

$$T_{display}(\Theta)=L*F_{dv}\sin(\Theta)\text{(from FIG. 1B)}.$$

Comparing the two formulas, $$T_{spring}(\Theta)+T_{display}(\Theta)=0.$$

Therefore, by selecting spring 320 according to the weight of a display ($F_{dv}$ 170), the apparatus shown in FIG. 5B provides $T_{spring}$ 540 that, based upon the above formula, is equally opposite of $T_{display}$ 180 throughout lever arm 100's range of motion (rotation angle 140), regardless of whether $T_{display}$ 180 is non-linear over lever arm 100's range of motion (see FIGS. 2, 8, and corresponding text for further details).

Figure 6:
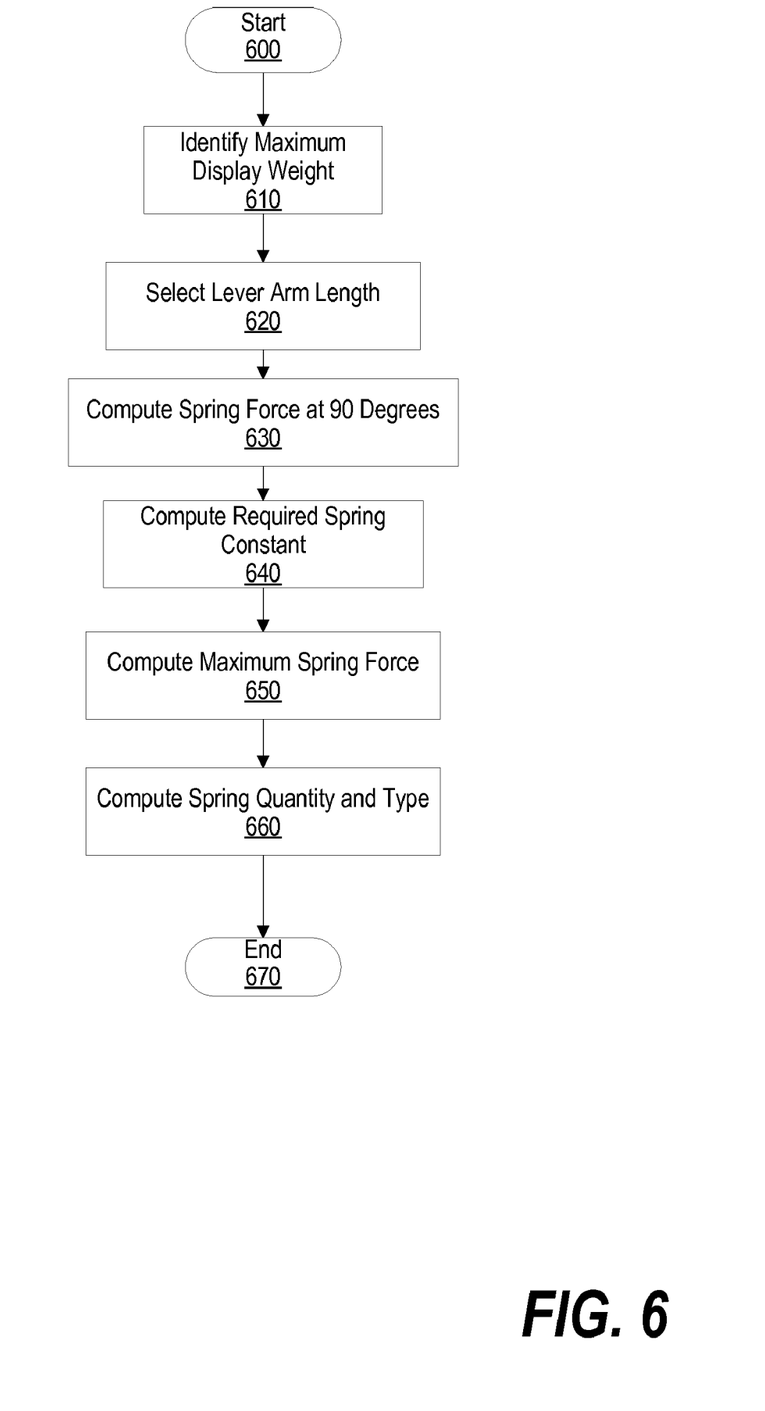
FIG. 6 is a flowchart showing steps taken in selecting a lever arm and a spring in a counterbalance apparatus.

FIG. 6 is a flowchart showing steps taken in selecting a lever arm and a spring in a counterbalance apparatus. Processing commences at 600, whereupon a user identifies a maximum display weight (e.g., 15 pounds) at step 610. The maximum display weight corresponds to a vertical force of the display ($F_{dv}$) discussed previously. At step 620, a user selects a lever arm length based upon the amount of distance that the user wishes to design the apparatus to travel. For example, if the user wishes to design an apparatus that travels six inches in the vertical direction, the user selects a lever arm of three inches (one-half of the total distance).

At step 630, processing computes a spring force when the lever arm is at 90 degrees (horizontal) using the formula $F_s=\sqrt{2} F_{dv}$ from FIG. 4B. In turn, at step 640, processing computes a spring constant using the formula $K=F_{dv}/L$ from FIG. 4B. Processing, at step 650, computes a maximum spring force using the formula $F_{s\ max}=2*L*K$, which is at a point when the lever arm is 180 degrees from its starting point, or twice the lever arm length (2L).

Once processing computes the maximum spring force required, spring types and quantities may be selected (step 660). During this step, various options are available, such as selecting one larger spring that provides the required spring constant, or selecting a few smaller springs that, when combined in parallel, provide the required spring constant. Processing ends at 670.

FIG. 7 is a table showing a spring torque canceling out a display torque throughout a lever arm's range of motion. Table 700 includes columns 710 through 750. Column 710 includes rotation angle values in five degree increments. Column 720 includes rotation angle values in radians that are used to compute display torque and spring torque, which are shown in columns 730 and 740, respectively. And, column 750 shows that the combination of the display torque and the spring torque is zero throughout the lever arm range of motion from 0 degrees to 180 degrees.

FIG. 8 is a diagram that plots table values shown in FIG. 7. Graph 800 includes display torque 810, spring torque 820, and resultant torque 830. As can be seen, spring torque 820 equally tracks display torque 810 in an opposite direction, which shows that resultant torque 830 remains at zero throughout the range of motion of a lever arm.

Figure 9:
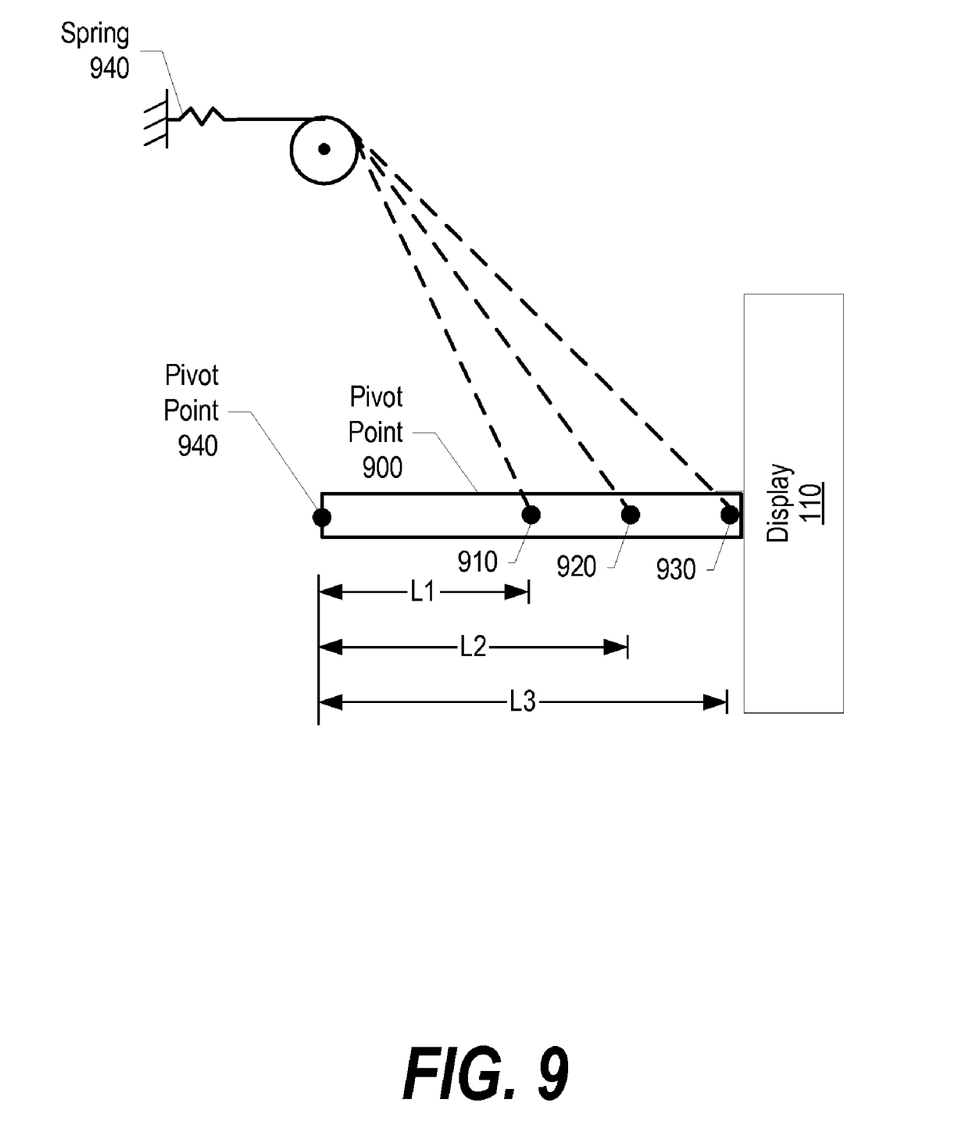
FIG. 9 is a diagram showing another embodiment of the invention described herein utilizing a torsion spring.

FIG. 9 is a diagram showing another embodiment of the invention described herein. Lever arm 900 includes couplings 910-930 (e.g., holes, studs, etc.) that allows a cable to couple to lever arm 900 and different lengths L1, L2, or L3, respectively, based upon display 110's weight. In turn, an apparatus may utilizes lever arm 900 to rotate around pivot point 940 for different displays weighing different amounts, thus producing different display torques, simply by adjusting the location at which the cable couples to lever arm 900. For example, when used with a heavy monitor, a user may couple the cable to coupling 930 (longer lever arm length L3), but when used with a light monitor, the user may couple the cable to coupling 910 (shorter lever arm length L1).

Figure 10:
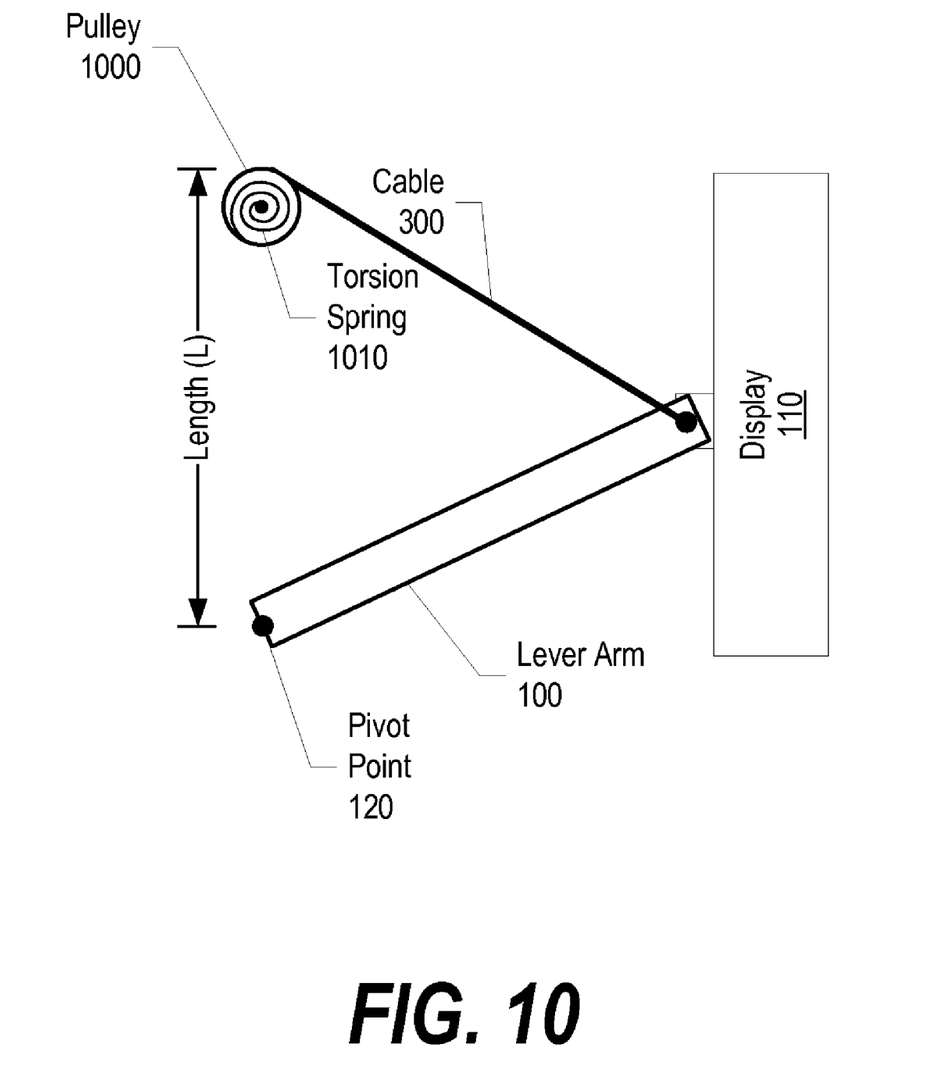
FIG. 10 is a diagram showing another embodiment of the invention described herein utilizing multiple couplings on a lever arm that are located at different lever arm lengths.

FIG. 10 is a diagram showing another embodiment of the invention described herein. FIG. 10 includes a pulley (pulley 1000) with a torsion spring (torsion spring 1010) instead of using a tension spring, such as spring 320 shown in FIG. 3. In this embodiment, cable 300 winds around pulley 1000 and couples to lever arm 100, which supports display 110. As lever arm 100 moves away from pulley 1000, torsion spring 1010 provides a counter torque through pulley 1000 to lever arm 100 around pivot point 120 (through cable 300) that is equally opposite of display 110's torque around pivot point 120 throughout lever arm 100's range of motion.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention.

Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An apparatus comprising:
   a display;
   a lever arm, wherein a first end of the lever arm is coupled to a pivot point and wherein a second end of the lever arm is coupled to the display at a lever arm length from the pivot point, the display rotating around the second end of the lever arm, and the lever arm rotating around the pivot point through a lever arm range of motion, the weight of the display producing a display torque around the pivot point that varies as the lever arm rotates through the lever arm range of motion;
   a spring coupled to the lever arm using a cable, the spring producing a spring torque, through the lever arm, around the pivot point that is equally opposite of the display torque throughout the lever arm range of motion as the lever arm travels through the lever arm range of motion; and
   a pulley that guides the cable between the spring and the lever arm, wherein a point on the pulley that contacts the cable is at the lever arm length from the pivot point.

2. The apparatus of claim 1 wherein both the spring torque and the display torque vary based upon a rotation angle that corresponds to the lever arm range of motion.

3. The apparatus of claim 2 wherein the rotation angle varies from 0 degrees to 180 degrees.

4. The apparatus of claim 1 wherein the display torque varies non-linearly throughout the lever arm range of motion.

5. The apparatus of claim 1 wherein the display torque equals the lever arm length multiplied by a vertical force of the display multiplied by sine of the rotation angle.

6. The apparatus of claim 1 wherein the spring torque equals the lever arm length multiplied by the force of the spring multiplied by cosine of one-half of the rotation angle.

* * * * *